(12) United States Patent  (10) Patent No.: US 8,884,464 B2
Jayaraman et al.  (45) Date of Patent: Nov. 11, 2014

(54) TWIN BOOST CONVERTER WITH INTEGRATED CHARGER FOR UPS SYSTEM

(75) Inventors: Chandrasekaran Jayaraman, Karnataka (IN); Pradeep Tolakanahalli, Karnataka (IN); Damir Klikic, Waltham, MA (US)

(73) Assignee: Schneider Electric IT Corporation, West Kingston, RI (US)

( * ) Notice: Subject to any disclaimer, the term of this patent is extended or adjusted under 35 U.S.C. 154(b) by 380 days.

(21) Appl. No.: 13/219,760

(22) Filed: Aug. 29, 2011

(65) Prior Publication Data

US 2013/0049699 A1  Feb. 28, 2013

(51) Int. Cl.
*H02J 7/00* (2006.01)
*H02J 9/00* (2006.01)
*H02M 5/458* (2006.01)
*H02M 1/10* (2006.01)
*H02J 9/06* (2006.01)
*H02M 3/158* (2006.01)

(52) U.S. Cl.
CPC ............... *H02M 5/458* (2013.01); *H02M 1/10* (2013.01); *H02J 9/062* (2013.01); *H02M 3/1582* (2013.01)
USPC .............................. 307/66; 320/137; 320/166

(58) Field of Classification Search
USPC ....................................... 320/137, 166; 307/66
See application file for complete search history.

(56) References Cited

U.S. PATENT DOCUMENTS

| 4,564,767 A | 1/1986 | Charych |
| 4,673,826 A | 6/1987 | Masson |
| 4,683,529 A | 7/1987 | Bucher, II |
| 4,816,982 A | 3/1989 | Severinsky |
| 4,823,247 A | 4/1989 | Tamoto |
| 4,827,151 A | 5/1989 | Okado |
| 4,831,508 A | 5/1989 | Hunter |
| 4,937,505 A | 6/1990 | Deglon et al. |
| 4,964,029 A | 10/1990 | Severinsky et al. |

(Continued)

FOREIGN PATENT DOCUMENTS

| CN | 2202371 Y | 6/1995 |
| CN | 2729995 Y | 9/2005 |

OTHER PUBLICATIONS

David M. Xu et al., Quasi Soft-Switching Partly Decoupled Three-Phase PFC with Approximate Unity Power Factor, 1998, pp. 953-957.

(Continued)

*Primary Examiner* — Richard V Muralidar
*Assistant Examiner* — David Henze-Gongola
(74) *Attorney, Agent, or Firm* — Lando & Anastasi, LLP

(57) ABSTRACT

A power converter circuit is coupled to an AC power input, a backup power input, a first capacitive element and a second capacitive element. The power converter circuit is configured to, in a line mode of operation and during a positive portion of an AC input voltage, convert the AC input voltage into a positive DC output voltage through a first inductive element and provide a charging voltage to a backup power source through a second inductive element using a negative DC output voltage stored in the second capacitive element, and, in the line mode of operation and during a negative portion of the AC input, convert the AC input voltage into the negative DC output voltage through the second inductive element and provide the charging voltage to the backup power source through the first inductive element using the positive DC output voltage stored in the first capacitive element.

20 Claims, 11 Drawing Sheets

(56) References Cited

U.S. PATENT DOCUMENTS

| | | | |
|---|---|---|---|
| 4,980,812 A | 12/1990 | Johnson, Jr. et al. | |
| 5,017,800 A | 5/1991 | Divan | |
| 5,047,913 A | 9/1991 | De Doncker et al. | |
| 5,126,585 A | 6/1992 | Boys | |
| 5,184,025 A | 2/1993 | McCurry et al. | |
| 5,519,306 A | 5/1996 | Itoh et al. | |
| 5,602,462 A | 2/1997 | Stich et al. | |
| 5,654,591 A | 8/1997 | Mabboux et al. | |
| 5,684,686 A | 11/1997 | Reddy | |
| 5,923,103 A | 7/1999 | Pulizzi et al. | |
| 5,968,398 A | 10/1999 | Schmitt et al. | |
| 5,982,652 A | 11/1999 | Simonelli et al. | |
| 6,046,920 A | 4/2000 | Cazabat et al. | |
| 6,069,412 A | 5/2000 | Raddi et al. | |
| 6,191,500 B1 | 2/2001 | Toy | |
| 6,201,371 B1 | 3/2001 | Kawabe et al. | |
| 6,215,287 B1 | 4/2001 | Matsushiro et al. | |
| 6,330,176 B1 | 12/2001 | Thrap et al. | |
| 6,400,591 B2 | 6/2002 | Reilly et al. | |
| 6,483,730 B2 | 11/2002 | Johnson, Jr. | |
| 6,639,383 B2 | 10/2003 | Nelson et al. | |
| 6,661,678 B2 | 12/2003 | Raddi et al. | |
| 6,728,119 B2 | 4/2004 | Reilly et al. | |
| 6,737,840 B2 | 5/2004 | McDonald et al. | |
| 6,757,185 B2 | 6/2004 | Rojas Romero | |
| 6,838,925 B1 | 1/2005 | Nielsen | |
| 6,850,426 B2 | 2/2005 | Kojori et al. | |
| 6,853,097 B2 | 2/2005 | Matsuda et al. | |
| 6,853,564 B2 | 2/2005 | Kravitz | |
| 6,944,035 B2 | 9/2005 | Raddi et al. | |
| 7,005,759 B2 | 2/2006 | Ying et al. | |
| 7,012,825 B2 | 3/2006 | Nielsen | |
| 7,091,625 B2 | 8/2006 | Okusawa et al. | |
| 7,126,409 B2 | 10/2006 | Nielsen | |
| 7,239,043 B2 | 7/2007 | Taimela et al. | |
| 7,274,112 B2 | 9/2007 | Hjort et al. | |
| 7,402,921 B2 | 7/2008 | Ingemi et al. | |
| 7,652,393 B2 * | 1/2010 | Moth | 307/64 |
| 7,705,489 B2 * | 4/2010 | Nielsen et al. | 307/66 |
| 8,143,744 B2 | 3/2012 | Nielsen et al. | |
| 8,228,046 B2 | 7/2012 | Ingemi et al. | |
| 8,305,779 B2 * | 11/2012 | Lu et al. | 363/37 |
| 2002/0130648 A1 | 9/2002 | Raddi et al. | |
| 2002/0191425 A1 | 12/2002 | Geissler | |
| 2003/0048006 A1 | 3/2003 | Shelter et al. | |
| 2003/0220026 A1 | 11/2003 | Oki et al. | |
| 2004/0084967 A1 | 5/2004 | Nielsen | |
| 2004/0155526 A1 | 8/2004 | Naden et al. | |
| 2004/0160789 A1 | 8/2004 | Ying et al. | |
| 2005/0036248 A1 | 2/2005 | Klikic et al. | |
| 2005/0168073 A1 | 8/2005 | Hjort | |
| 2005/0201127 A1 | 9/2005 | Tracy et al. | |
| 2005/0275976 A1 | 12/2005 | Taimela et al. | |
| 2005/0278075 A1 | 12/2005 | Rasmussen et al. | |
| 2006/0043792 A1 | 3/2006 | Hjort et al. | |
| 2006/0043793 A1 | 3/2006 | Hjort et al. | |
| 2006/0043797 A1 | 3/2006 | Hjort et al. | |
| 2006/0044846 A1 | 3/2006 | Hjort et al. | |
| 2006/0072262 A1 | 4/2006 | Paik et al. | |
| 2006/0238941 A1 | 10/2006 | Ingemi et al. | |
| 2006/0279970 A1 | 12/2006 | Kernahan | |
| 2007/0055409 A1 | 3/2007 | Rasmussen et al. | |
| 2007/0064363 A1 | 3/2007 | Nielsen et al. | |
| 2007/0228837 A1 | 10/2007 | Nielsen et al. | |
| 2008/0042491 A1 | 2/2008 | Klikic et al. | |
| 2008/0061628 A1 | 3/2008 | Nielsen et al. | |
| 2008/0067872 A1 | 3/2008 | Moth | |
| 2008/0157601 A1 | 7/2008 | Masciarelli et al. | |
| 2008/0197706 A1 | 8/2008 | Nielsen | |
| 2008/0272744 A1 | 11/2008 | Melanson | |
| 2009/0039706 A1 | 2/2009 | Kotlyar et al. | |
| 2009/0046415 A1 | 2/2009 | Rasmussen et al. | |
| 2010/0054002 A1 * | 3/2010 | Lu et al. | 363/37 |
| 2010/0072819 A1 | 3/2010 | Lee et al. | |
| 2010/0315849 A1 | 12/2010 | Ingemi et al. | |
| 2011/0227418 A1 | 9/2011 | Pyboyina et al. | |
| 2012/0175958 A1 * | 7/2012 | Dighrasker et al. | 307/66 |

OTHER PUBLICATIONS

Notification of Transmittal of the International Search Report and the Written Opinion of the International Searching Authority from corresponding PCT/US2012/052652 dated Nov. 29, 2012.

* cited by examiner

TWIN BOOST CONVERTER WITH INTEGRATED CHARGER FOR UPS SYSTEM

BACKGROUND OF THE INVENTION

1. Field of Invention

Embodiments of the invention relate generally to power conversion, and more particularly, to AC-DC power conversion in an uninterruptible power supply.

2. Discussion of Related Art

An uninterruptible power supply (UPS) is used to provide backup power to an electrical device, or load, when the primary power source, or mains, fails. Typical loads include computer systems, but other loads, such as heating/cooling/ventilation systems, lighting systems, network switches and routers, and security and data center management systems may also be powered by a UPS. A UPS designed for data center or industrial use may provide backup power for loads of between 1 and 20 kVA for several hours.

A UPS unit typically includes one or more batteries as a power source when AC mains power is unavailable. DC power provided by the battery is converted to AC power by a power converter circuit, which in turn is provided to the load. A battery charger, which converts AC power to DC power, may be included in the UPS to charge the battery when AC mains is available to ensure that backup power will be available when needed. The UPS may also include a control unit for automatically managing the operation of the UPS and the power conversion functions.

BRIEF SUMMARY OF THE INVENTION

According to one embodiment, a power converter includes an AC power input having a phase input connection and a neutral input connection. The AC power input is configured to receive an AC input voltage. The power converter further includes a backup power input configured to receive a backup voltage from a backup power source, a first capacitive element configured to store a positive DC output voltage with respect to the neutral input connection, a second capacitive element configured to store a negative DC output voltage with respect to the neutral input connection, and a power converter circuit having a first inductive element and a second inductive element. The power converter circuit is coupled to the AC power input, the backup power input, the first capacitive element and the second capacitive element. The power converter circuit is configured to, in a line mode of operation and during a positive portion of the AC input voltage, convert the AC input voltage into the positive DC output voltage through the first inductive element and provide a charging voltage to the backup power source through the second inductive element using the negative DC output voltage stored in the second capacitive element, and, in the line mode of operation and during a negative portion of the AC input, convert the AC input voltage into the negative DC output voltage through the second inductive element and provide the charging voltage to the backup power source through the first inductive element using the positive DC output voltage stored in the first capacitive element.

In another embodiment, the power converter circuit may be further configured to, in a backup mode of operation and during a positive DC output voltage conversion phase, convert the backup voltage into the positive DC output voltage through the first inductive element, and, in the backup mode of operation and during a negative DC output voltage conversion phase, convert the backup voltage into the negative DC output voltage through the second inductive element.

In another embodiment, the power converter may include an inverter circuit coupled to the first capacitive element and the second capacitive element. The inverter circuit may be configured to generate an AC output voltage from the positive DC output voltage and the negative DC output voltage.

In another embodiment, the backup power source may include a battery having a first end connection, a second end connection, and no midpoint connection. The power converter circuit may include a first active switch coupled to the phase input connection and the first end connection of the battery, a second active switch coupled to the phase input connection and the second end connection of the battery, a third active switch coupled to the neutral input connection and the first end connection of the battery, and a fourth active switch coupled to the neutral input connection and the second end connection of the battery. In yet another embodiment, the power converter may include a rectifier circuit having a positive output and a negative output. The rectifier circuit may be coupled to the phase input connection. The first active switch may be coupled to the positive output of the rectifier circuit and the second active switch may be coupled to the negative output of the rectifier circuit.

In another embodiment, the backup power source may include a battery having a first end connection, a second end connection coupled to the neutral input connection, and no midpoint connection. The power converter circuit may include a first relay configured to switchably couple the first inductive element to the phase input connection and the first end connection of the battery, a second relay configured to switchably couple the second inductive element to the phase input connection and the second end connection of the battery, and an active switch coupled to the first end connection of the battery and the second inductive element.

In yet another embodiment, the power converter may include a rectifier circuit having a positive output and a negative output. The rectifier circuit may be coupled to the phase input connection. The first relay may be coupled to the positive output of the rectifier circuit and the second relay may be coupled to the negative output of the rectifier circuit.

In another embodiment, the backup power source may include a battery having a first end connection, a second end connection, and a midpoint connection coupled to the neutral input connection. The power converter circuit may include a first relay configured to switchably couple the first inductive element to the phase input connection and the first end connection of the battery, and a second relay configured to switchably couple the second inductive element to the phase input connection and the second end connection of the battery. In yet another embodiment, the power converter may include a rectifier circuit having a positive output and a negative output. The rectifier circuit may be coupled to the phase input connection. The first relay may be coupled to the positive output of the rectifier circuit and the second relay may be coupled to the negative output of the rectifier circuit.

According to one embodiment, a power converter includes an AC power input having a phase input connection and a neutral input connection. The AC power input is configured to receive an AC input voltage. The power converter further includes a backup voltage source to provide a backup voltage, a first storage element configured to store a positive DC output voltage with respect to the neutral input connection, a second storage element configured to store a negative DC output voltage with respect to the neutral input connection, and means for, in a line mode of operation and during a positive portion of the AC input voltage, converting the AC input voltage into the positive DC output voltage and providing the negative DC output voltage stored in the second storage element to the backup voltage source, and, in the line mode of operation and during a negative portion of the AC input voltage, converting the AC input voltage into the negative DC output voltage and providing the positive DC output voltage stored in the first storage element to the backup voltage source.

In another embodiment, the power converter may include means for, in a backup mode of operation and during a positive DC output voltage conversion phase, converting the backup voltage into the positive DC output voltage, and, in the backup mode of operation and during a negative DC output voltage conversion phase, converting the backup voltage into the negative DC output voltage.

In another embodiment, the backup voltage source may include at least one battery. In yet another embodiment, the battery may have a first end connection coupled to the phase input connection and a second end connection. In yet another embodiment, the second end connection of the battery may be coupled to the neutral input connection.

In another embodiment, the battery may have a first end connection, a second end connection, and a midpoint connection, the midpoint connection being coupled to the neutral input connection.

According to one embodiment, a method of providing power to a load includes receiving AC input power at a phase input connection and a neutral input connection from a primary power source. The method further includes converting the AC input power into a positive DC output voltage with respect to the neutral input connection using a first inductive element during a positive portion of the AC input power. The method further includes converting the AC input power into a negative DC output voltage with respect to the neutral input connection using a second inductive element during a negative portion of the AC input power. The method further includes providing the negative DC output voltage to a backup power source using the second inductive element during the positive portion of the AC input power. The method further includes providing the positive DC output voltage to the backup power source using the first inductive element during the negative portion of the AC input power.

In another embodiment, the AC input power may be converted into the positive DC output voltage and into the negative DC output voltage using at least one first circuit configured as a boost converter. The positive DC output voltage and the negative DC output voltage may each be provided to the backup power source using at least one second circuit configured as a buck converter.

In another embodiment, the method may include detecting a loss of the AC input power, converting a backup power from a backup power source into the positive DC output voltage using the first inductive element during a positive DC output voltage conversion phase, and converting the backup power from the backup power source into the negative DC output voltage using the second inductive element during a negative DC output voltage conversion phase.

In another embodiment, the method may include producing an AC output voltage from the positive DC output voltage and the negative DC output voltage. In another embodiment, the backup power source may include at least one battery.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

Figure 1:
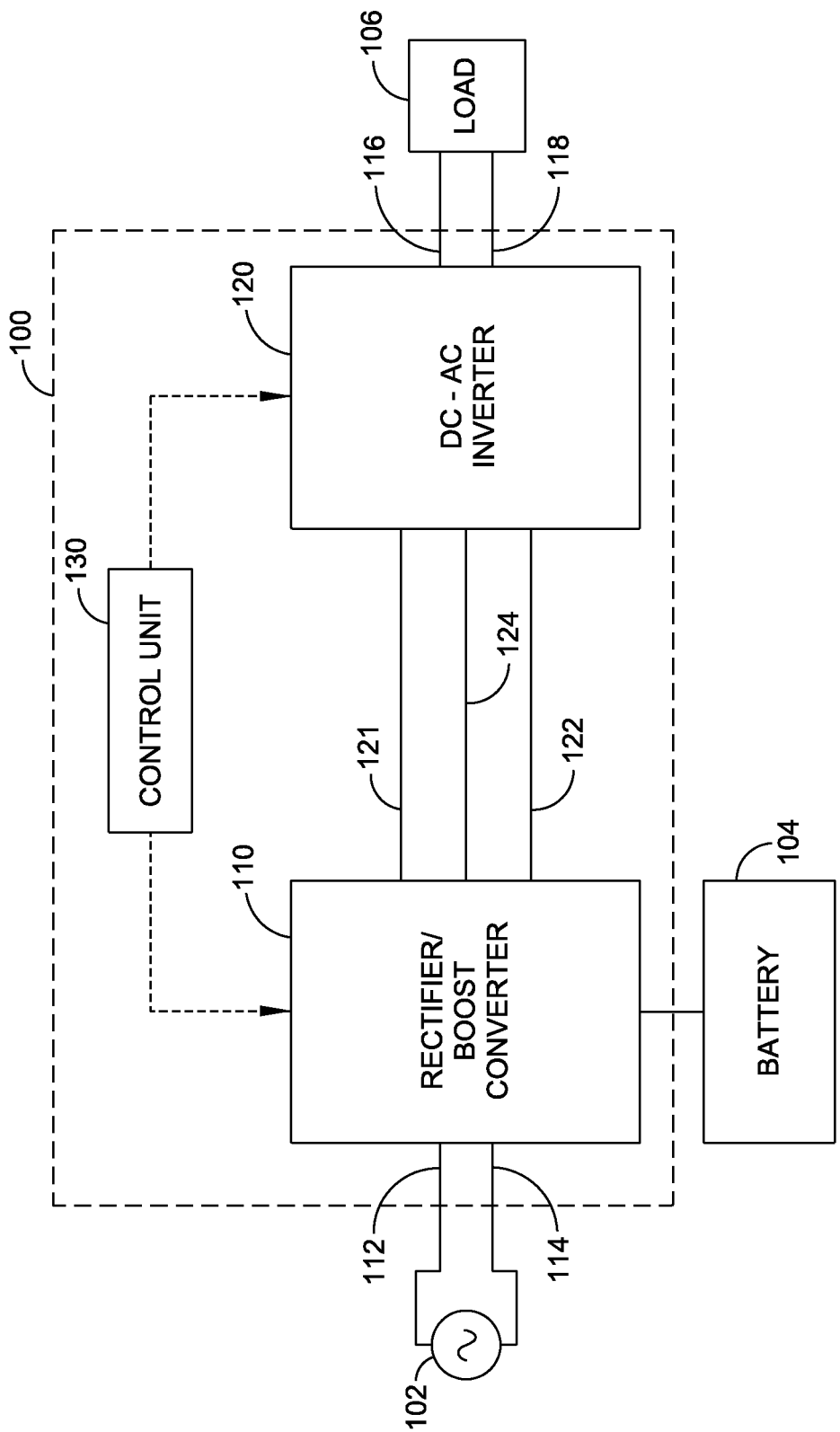
FIG. 1 is a functional block diagram of an uninterruptible power supply in accordance with one embodiment of the present invention.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 is a block diagram of one embodiment of a UPS 100 that provides regulated power from an AC power source 102 as well as back-up power from a battery 104 to a load 106. The UPS 100 includes a rectifier/boost converter 110, an inverter 120, and a control unit 130 for controlling the rectifier/boost converter and the inverter. The UPS has inputs 112 and 114 that couple respectively to line (phase) and neutral of the AC power source 102, and outputs 116 and 118 to provide line and neutral, respectively, to the load 106.

In line mode of operation, under control of the control unit 130, the rectifier/boost converter 110 receives the input AC voltage and provides positive and negative DC voltages at lines 121 and 122 with respect to a common or neutral line 124. In backup mode of operation (also called battery mode of operation), upon loss of input AC power, the rectifier/boost converter 110 generates the DC voltages from the battery 104. The neutral line 124 may be coupled to the input neutral 114 and the output neutral 118 to provide a continuous neutral path through the UPS 100. The inverter 120 receives the DC voltages from the rectifier/boost converter 110 and provides an output AC voltage at lines 116 and 118.

Various techniques have been developed for power conversion in a UPS. In one technique, the UPS includes a front-end power factor correction (PFC) converter and a DC-AC inverter. One such implementation is described in U.S. Pat.

No. 7,705,489 to Nielsen et al. To make neutral available to the load, some PFC converters are configured as dual boost converters. The Nielsen patent describes a UPS having a dual boost converter and a split DC bus (also called a dual DC bus).

Figure 2:
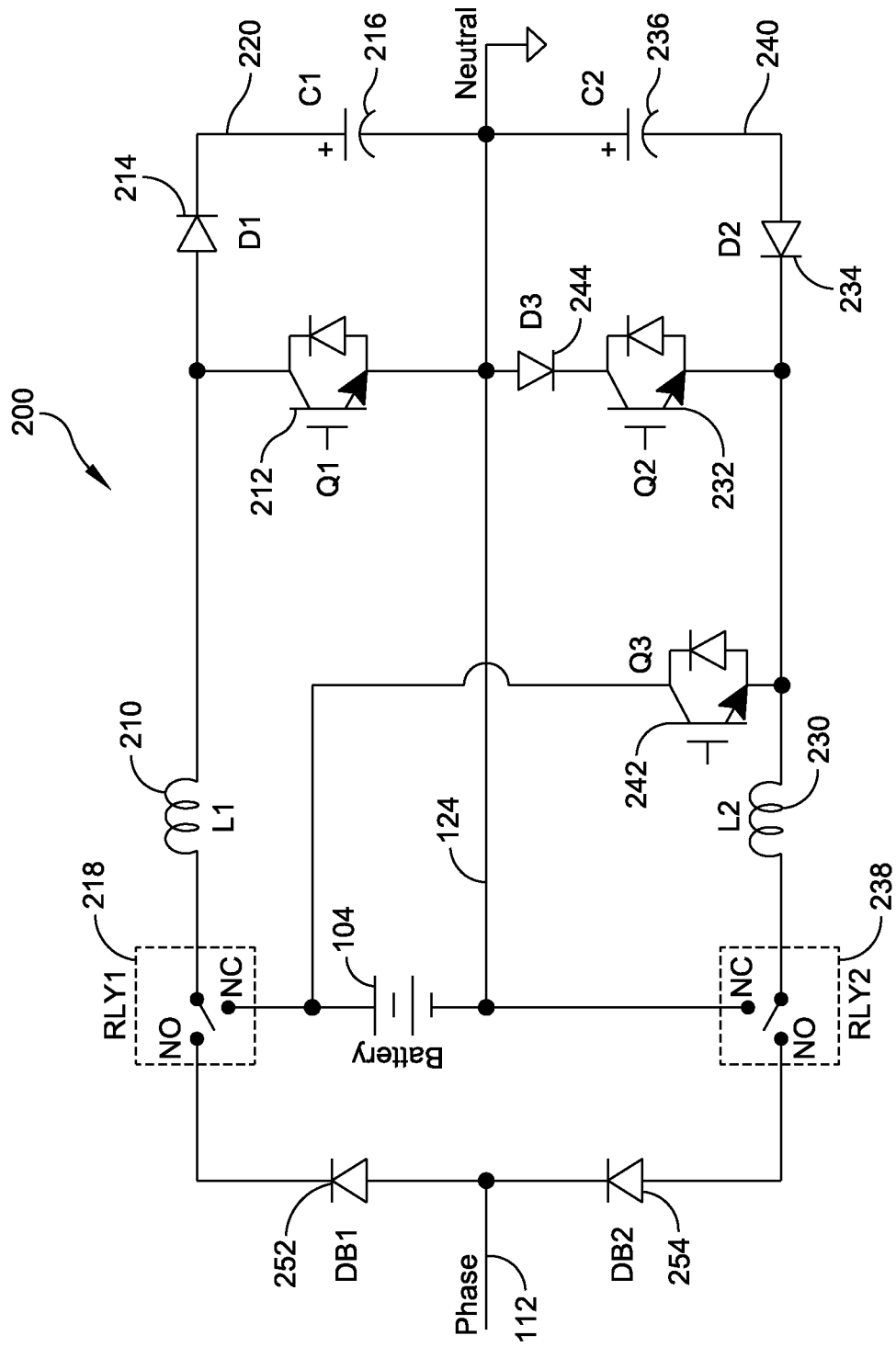
FIG. 2 is a schematic diagram of a conventional power conversion circuit.

FIG. 2 illustrates a typical UPS having a dual boost converter, which is generally indicated at 200. The dual boost converter 200 includes a positive-side boost converter and a negative-side boost converter.

The positive-side boost converter has a first inductor 210, a first switch 212, a first diode 214, and a first capacitor 216. The positive-side boost converter is switchably coupled to the external power source 102 (e.g., AC mains, not shown) through the phase input 112 and diode 252, or to the battery 104, through a first relay 218. It should be understood that any appropriate switch device, including a relay, may be used in place of the first relay 218 and other relays described herein. The first relay 218 is configured to switch the power feeding the positive-side boost converter between the external power source 102 and the battery 104. The positive-side boost converter is coupled to a first DC bus 220 and the neutral line 124. It should also be understood that a DC bus is not limited to a particular type of conductor and may include any suitable type of conductive element.

The negative-side boost converter has a second inductor 230, a second switch 232, a second diode 234, and a second capacitor 236. A third diode 244 is in series with the second switch 232 to prevent shorting of the battery 104 during backup mode operation, and functions as part of a buck-boost circuit in the backup mode of operation. The negative-side boost converter is switchably coupled to the external power source 102 (not shown) through diode 254, or to the battery 104, through a second relay 238. The second relay 238 is configured to switch the power feeding the negative-side boost converter between the external power source 102, via the phase input 112, and the battery 104. The negative-side boost converter is coupled to a second DC bus 240 and the neutral line 124.

In line mode of operation, the first relay 218 and the second relay 238 are each moved to the normally open (NO) position to couple the input AC line voltage at input 112 to inductors 210 and 230, such that positive and negative rectified voltages are respectively provided to inductors 210 and 230. Inductor 210 operates in conjunction with the first switch 212 and diode 214 as the positive-side boost converter, under the control of the controller 130 (not shown) using, for example, pulse width modulation to provide a positive DC voltage across capacitor 216. Similarly, inductor 230 operates in conjunction with the second switch 232 and diode 234 as a negative-side boost converter, also under the control of the controller 130, using, for example, pulse width modulation to provide a negative DC voltage across capacitor 236. The controller may control operation of the boost converters to provide power factor correction at the input of the uninterruptible power supply. The input currents are sinusoidal with low total harmonic distortion and are substantially in phase with the input voltage.

In backup mode of operation, the positive-side boost converter operates as a DC-DC boost converter, and the negative-side boost converter operates as a DC-DC buck-boost converter. Upon a failure of the AC voltage source 102 (not shown), the relays 218 and 238 are moved, under the control of the controller 130, to the normally closed (NC) positions to couple the battery 104 to inductors 210 and 230. The positive-side boost converter operates substantially as discussed above (that is, as a boost converter) using the battery voltage to generate the DC voltage across capacitor 216. To generate the negative voltage across the capacitor 236, a third switch 242, under the control of the controller 130 (not shown) and in conjunction with inductor 230, switch 232, diode 244, and diode 234, functions as a buck-boost circuit, with the third switch 242 being cycled off and on. In one example, during each cycle, the second switch 232 is turned on immediately prior to the third switch 242 being turned on to reduce the voltage across the third switch 242 at the time of turn-on to approximately the battery voltage. The drive signal to the second switch 232 remains on for the duration of the on time of the third switch 242. There is no current flow in the second switch 232 because the emitter of the second switch 232 is at or near the battery voltage. When the third switch 242 is turned off, the second switch 232 is again forward biased, and consequently the current in the second inductor 230 flows through the third diode 244 and the second switch 232. The second switch 232 stays on for approximately 0.5 microseconds to allow the third switch 242 enough time to completely turn off, and then the second switch 232 is turned off.

The UPS described above allows a single battery to be used in a split DC bus rectifier converter circuit. Other known approaches utilize dual batteries or a split battery having a midpoint or third tap to generate the positive and negative bus voltages in backup mode of operation.

Figure 3:
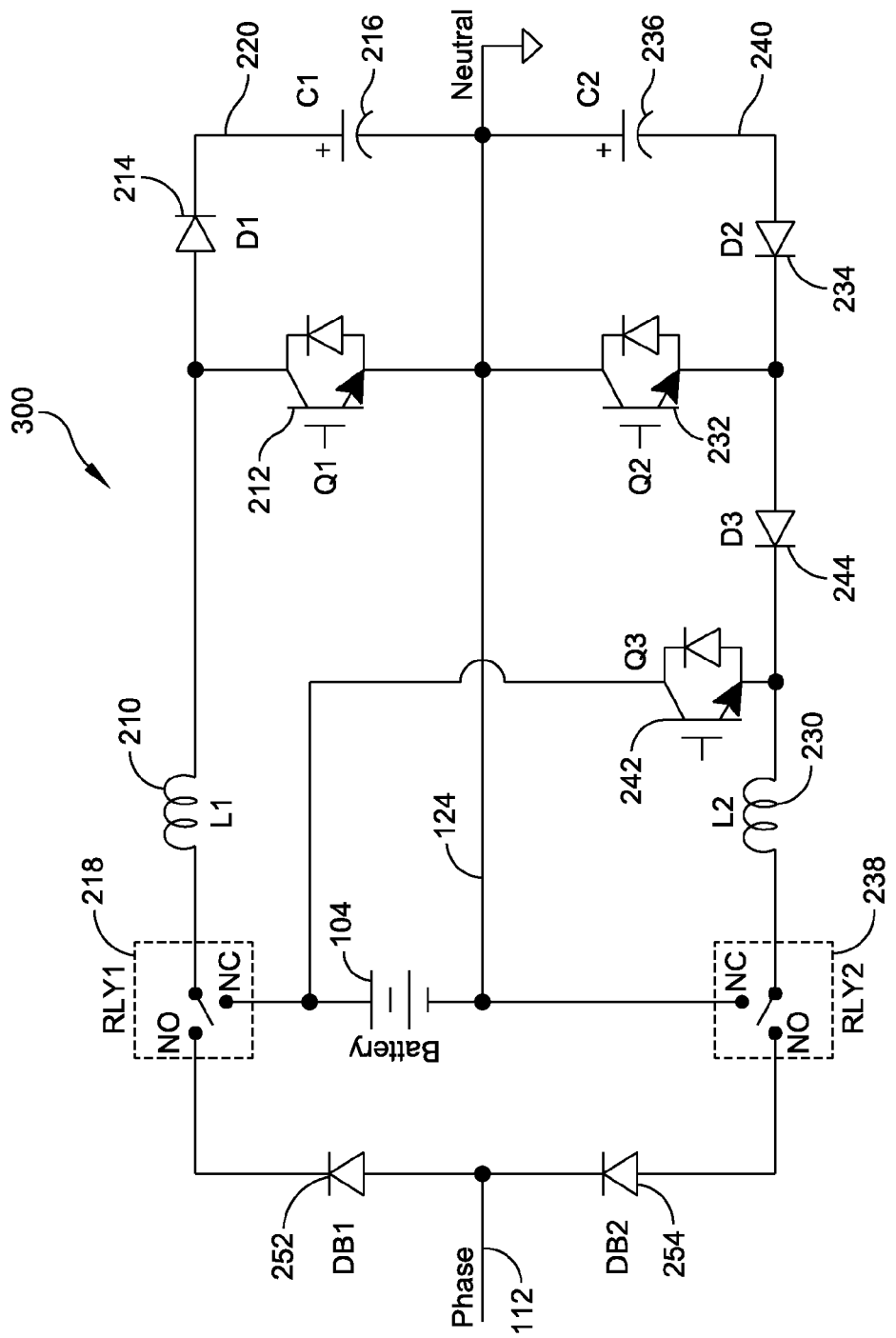
FIG. 3 is a schematic diagram of another conventional power conversion circuit.

FIG. 3 illustrates another typical UPS having a dual boost converter, which is generally indicated at 300. The UPS 300 is substantially the same as the UPS 200 shown in FIG. 2, except that the third diode 244 is in series with the second diode 234 during backup mode of operation.

Other techniques for converting power are known. For example, U.S. Pat. No. 5,654,591 issued to Mabboux et al describes a power conversion system wherein both the positive side and negative side converters are operated as DC-DC boost converters to transfer power from the battery to both the positive DC bus and the negative DC bus. The system described by Mabboux requires a separate charger circuit to charge the battery.

Figure 4:
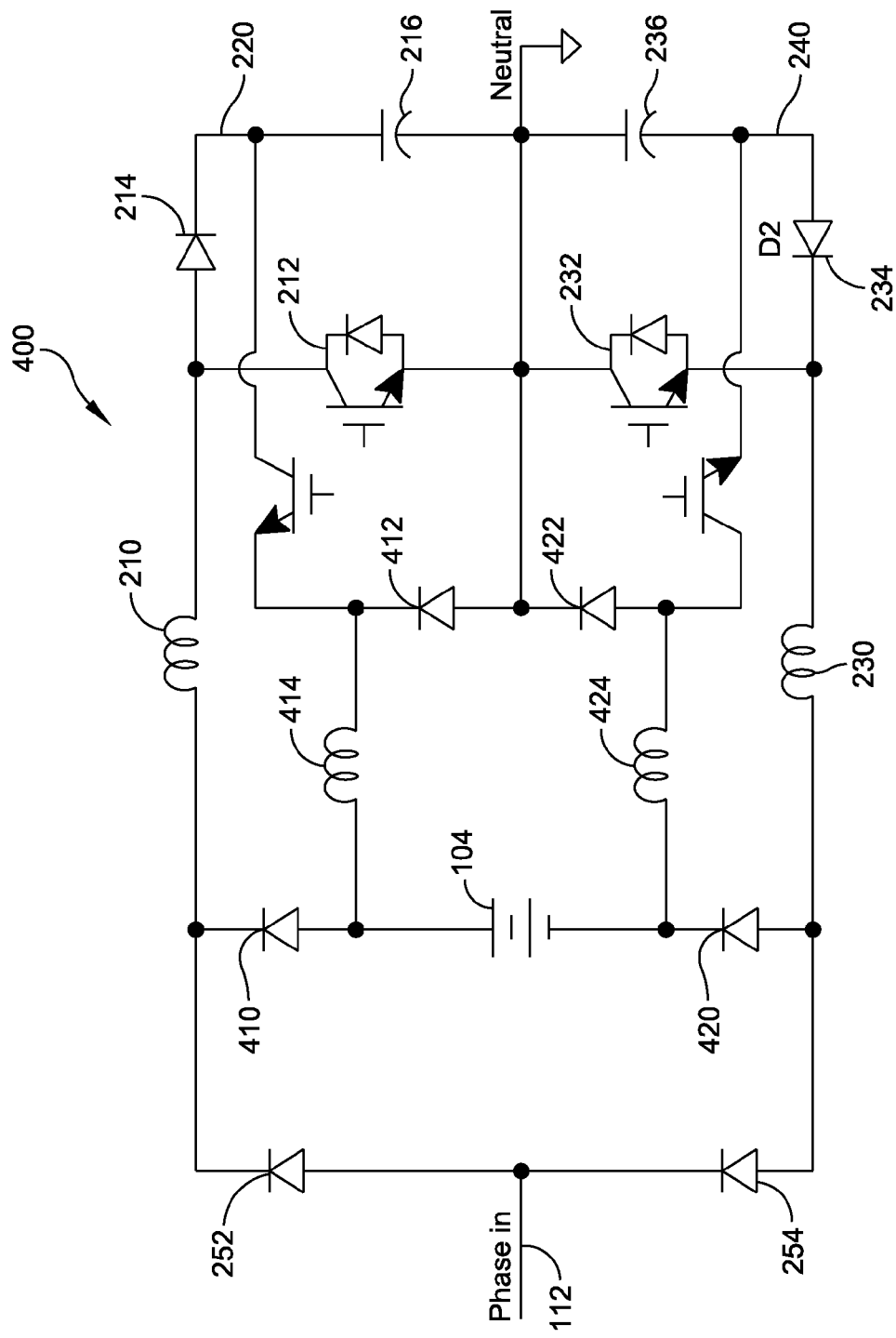
FIG. 4 is a schematic diagram of another conventional power conversion circuit.

In another example, U.S. Pat. No. 7,705,489 to Nielsen et al describes a topology wherein a front-end PFC converter is coordinated, through a controller, with a battery charger to charge the battery using a pair of buck converters. FIG. 4 illustrates one exemplary circuit 400 in accordance with Nielsen. The circuit 400 is similar to the circuit 300 described above with respect to FIG. 3, except that circuit 400 includes diodes 410, 412, 420 and 422, as well as inductors 414 and 424. This configuration requires two inductors 414 and 424, as part of a charger circuit that is separate from the converter circuit (for example, the converter circuit including inductor 210, switch 212, diode 214, and capacitor 216). To charge the battery 104, the inductor 414 operates during the positive half line power conversion cycle, and the inductor 424 operates during the negative half line power conversion cycle.

The typical power conversion techniques described above all require separate circuits or components (e.g., separate inductors, diodes, and switches) to perform the separate and distinct functions of providing output power from the battery (e.g., during line mode of operation) and providing charging power to the battery (e.g., during backup or battery mode of operation). For example, the circuit 400 shown in FIG. 4 requires inductors 210 and 230 for generating positive and negative DC voltages at DC busses 220 and 240, respectively, as well as inductors 414 and 424 for providing charging power to the battery 104 from the positive and negative DC voltages.

According to at least one embodiment of the invention, DC-AC power conversion in a UPS can be achieved using a minimum number of components and simple control devices, such as IGBT transistors or similar switching devices, to achieve high utilization of the components in various modes of operation (e.g., line and backup modes). For example, as will be described in further detail below, certain components may be electrically interconnected in one of several circuit configurations, enabling them to have multiple purpose uses. In particular, one circuit configuration includes an AC-to-DC power circuit, which may be used to convert power from a first voltage source, such as AC mains, to regulated positive and negative DC busses. Another circuit configuration includes a DC-to-DC power circuit, which may be used to provide power from a second voltage source, such as a battery, to the positive and negative DC busses. Yet another circuit configuration includes another DC-to-DC power circuit, which may be used to provide charging power from the positive and negative DC busses to the second voltage source, such as the battery. Another circuit configuration includes an inverter, which may be used to generate an AC output voltage. Such circuit configurations reduce complexity and also minimize the overall number of components having less than full (or nearly full) utilization rates across the various operating modes of the power converter.

According to one embodiment of the invention, the UPS includes a power correction factor (PFC) circuit integrated with at least one power converter circuit and a split DC bus. In line mode of operation, AC mains power is provided to the split DC bus. In battery mode, battery power is provided to the split DC bus. In at least one embodiment, the neutral of the AC mains and the return of the battery are common A plurality of switches are used to switch the UPS between line mode operation and battery mode operation.

Figure 5A:
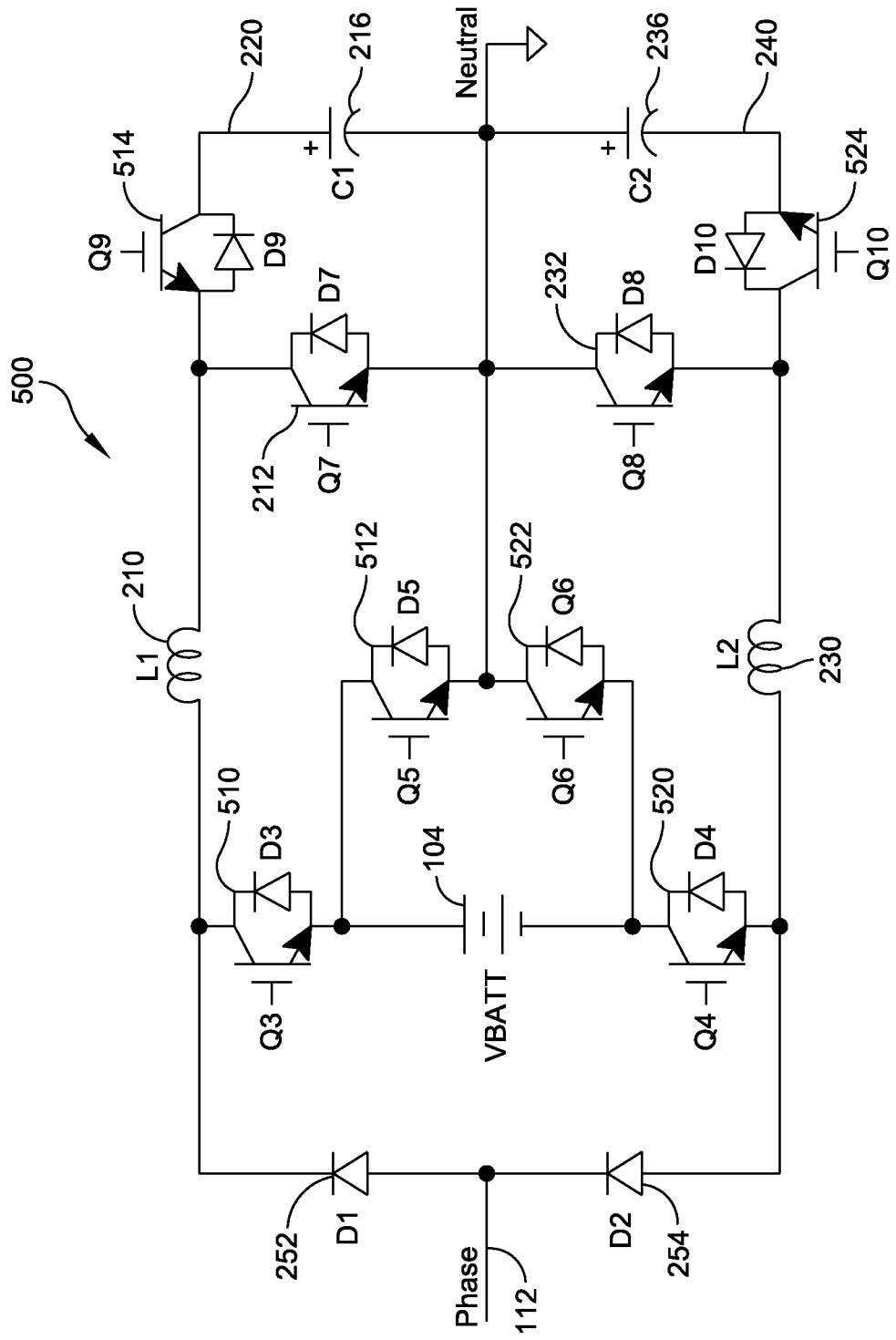
FIG. 5A is a schematic diagram of a power conversion circuit in accordance with one embodiment of the present invention.

FIG. 5A is a schematic diagram of a rectifier/boost/charger circuit 500 according to one embodiment of the invention. The rectifier/boost/charger circuit 500 may be used, for example, in a UPS such as shown in FIG. 1. The rectifier/boost/charger circuit 500 in FIG. 5A is similar to the circuit 400 of FIG. 4, except that the inductors 414 and 424 of circuit 400 are eliminated from circuit 500, and diodes 214, 234, 410, 412, 420 and 422 of circuit 400 are replaced with switches 514, 524, 510, 512, 520, and 522, respectively, in circuit 500. The switches 510, 512, 514, 520, 522 and 524 may each be implemented, for example, as actively controlled switches, such as transistors using FETs, IGBTs, MOSFETs, bipolar junction transistors, transistors with anti-parallel diodes, or other switching devices known to one of skill in the art.

Figure 5B:
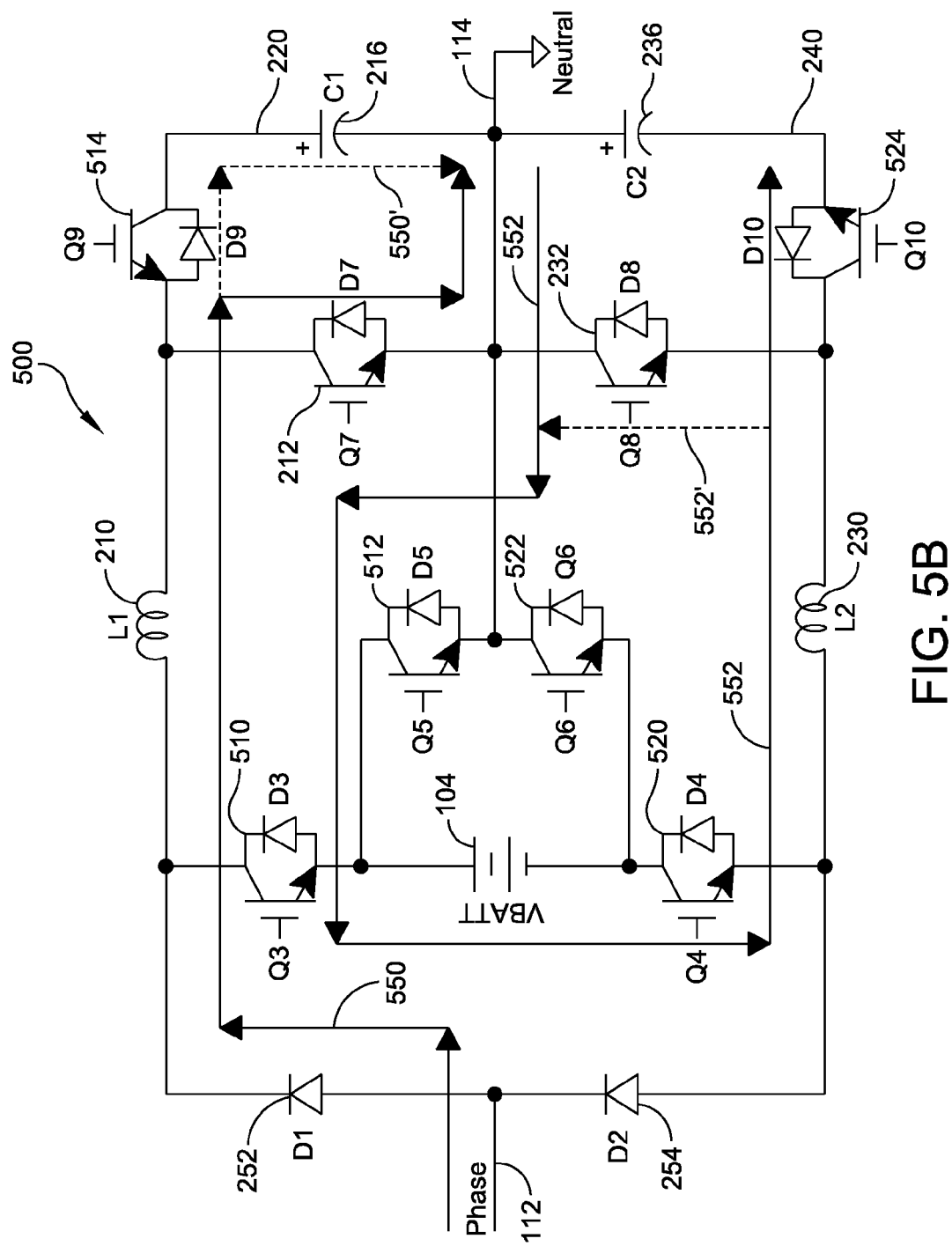
FIG. 5B is a schematic diagram of the power conversion circuit of FIG. 5A, illustrating a line mode of operation during a positive portion of an AC input.

According to one embodiment, and as further illustrated in FIG. 5B, in a line mode of operation and during a positive portion of the AC input 112 (e.g., during a positive portion of the AC input waveform), switch 212, switch 514 and inductor 210 are configured to operate as a boost converter to transfer power from the AC input line 112 via rectifier diode 252 to capacitor 216 at the positive DC bus 220. An input current 550 drawn from the line can be maintained sinusoidal by modulating the turn on time of switch 212, for example, by the control unit 130 (not shown). When the switch 212 is on (e.g., open), the current 550 follows the path of the solid line shown in FIG. 5B. When the switch 212 is off (e.g., closed), the current 550 follows the path of the broken line 550'. During the positive portion of the AC input 112, the switch 510 is turned off (e.g., opened).

A portion of the circuit 500, including switches 524, 232 and 512, inductor 230 and switch 520, which is turned on (e.g., closed) throughout the positive portion of the AC input 112, is configured to operate as a buck converter to charge the battery 104. By modulating the turn on time of switch 524, a battery charging current 552 and voltage of the battery VBATT can be controlled by drawing the power from the capacitor 236 at the negative DC bus 240. When the switch 524 is on (e.g., closed), the current 552 follows the path of the solid line shown in FIG. 5B. When the switch 524 is off (e.g., open), the current 552 follows the path of the broken line 552'.

Figure 5C:
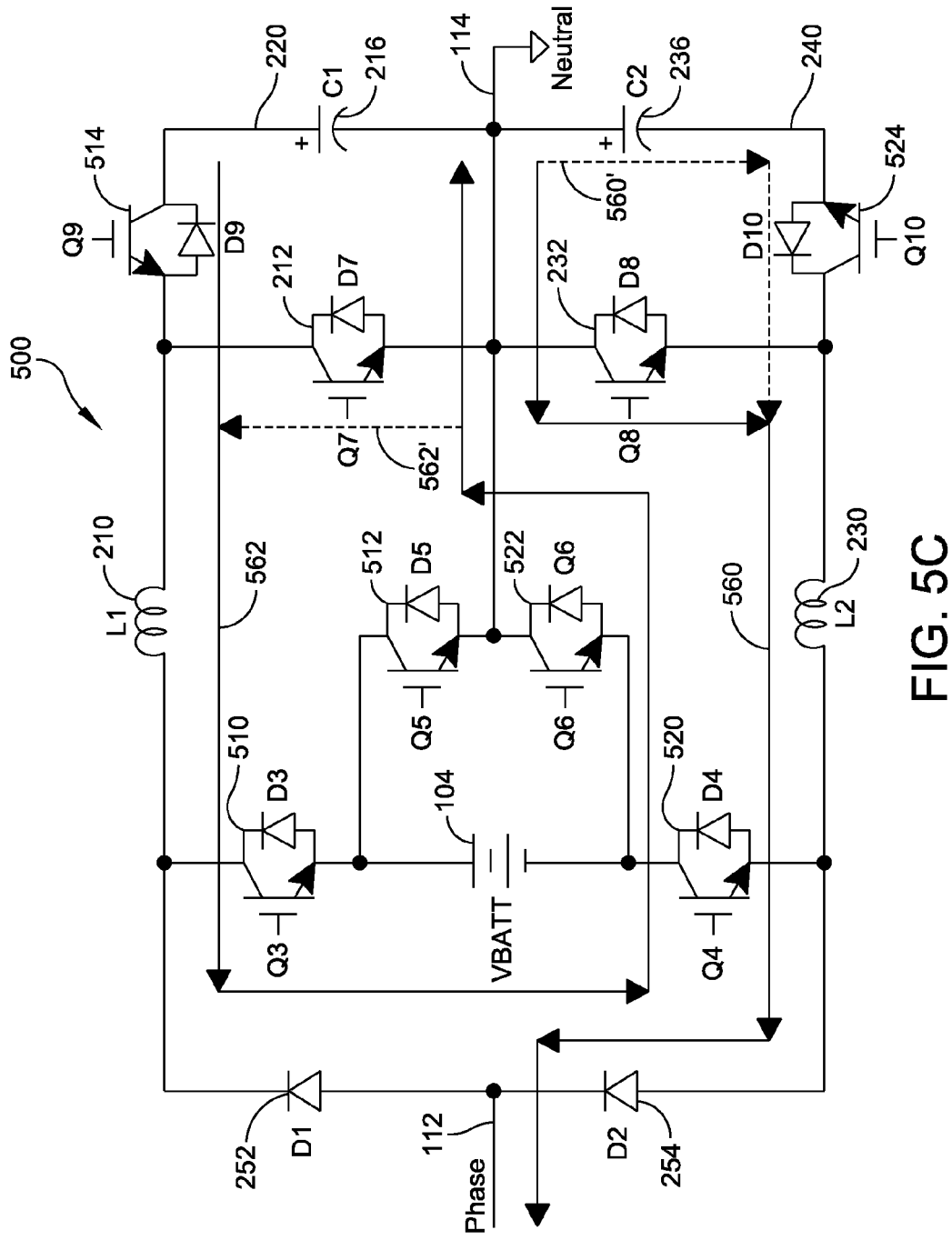
FIG. 5C is a schematic diagram of the power conversion circuit of FIG. 5A, illustrating the line mode of operation during a negative portion of the AC input.

The operation during a negative portion of the AC input 112 (e.g., during the negative portion of the AC input waveform) in the line mode of operation, as shown in FIG. 5C, is similar to the operation during the positive portion of the AC input 112. The circuit 500, including switches 232 and 524 and inductor 230, is configured to operate as a boost converter to transfer power from the AC input line 112 via rectifier diode 254 to capacitor 236. An input current 560 drawn from the line can be maintained sinusoidal by modulating the turn on time of switch 232. When the switch 232 is on (e.g., closed), the current 560 follows the path of the solid line shown in FIG. 5C. When the switch 232 is off (e.g., open), the current 560 follows the path of the broken line 560'. During the negative portion of the AC input 112, the battery 104 can be charged with a charging current 562 by operating switch 514, inductor 210, and switches 510, 522 and 212, for example, with the control unit 130 (not shown), as a buck converter, which transfers power from the capacitor 216 to the battery 104. When the switch 514 is on (e.g., closed), the current 562 follows the path of the solid line shown in FIG. 5C. When the switch 514 is off (e.g., open), the current 562 follows the path of the broken line 562'. Switch 510 is turned on and switch 520 is turned off during the negative portion of the AC input 112.

Figure 5D:
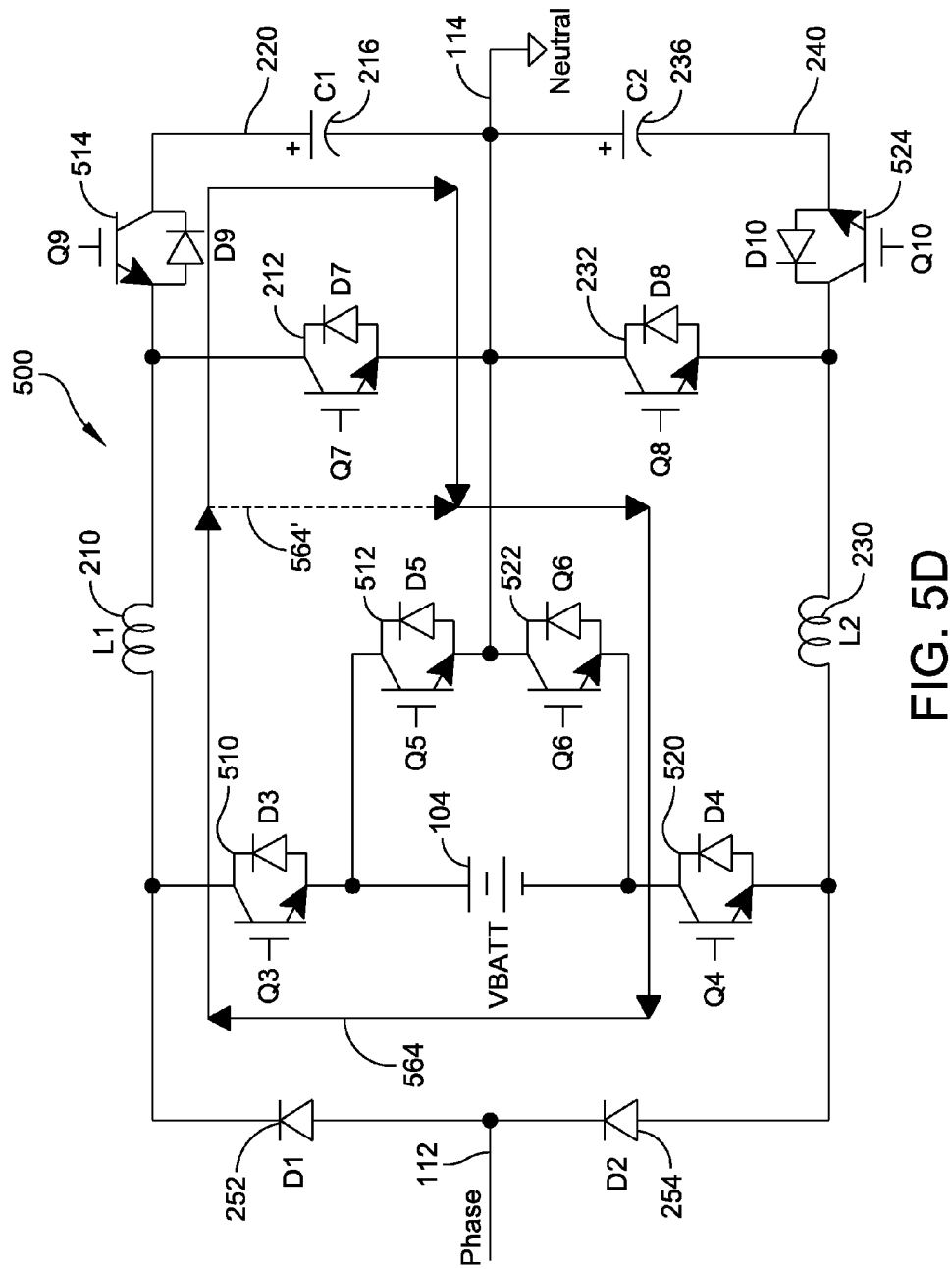
FIGS. 5D and 5E are a schematic diagrams of the power conversion circuit of FIG. 5A, illustrating a backup mode of operation.

According to another embodiment, and as further illustrated in FIG. 5D, in a battery mode of operation, when the input AC power 112 is not available, power from the battery 104 can be transferred to the positive DC bus 220, including capacitor 216, during a positive DC output voltage conversion phase by operating switches 212 and 514, and inductor 210, as a boost converter via switch 510. Switch 522 is turned on during this battery mode of operation. A current 564 transferred to the capacitor 216 can be controlled by modulating the turn on time of the switch 212. That is, when the switch 212 is off (e.g., open), the current 564 follows the path of the solid line shown in FIG. 5D and passes through the capacitor 216; otherwise, when the switch 212 is on (e.g., closed), the current 564 follows the path of the broken line 564' and passes through the switch 212. The switches 520, 512, 232 and 524 are turned off while transferring power to the positive DC bus 220.

Figure 5E:
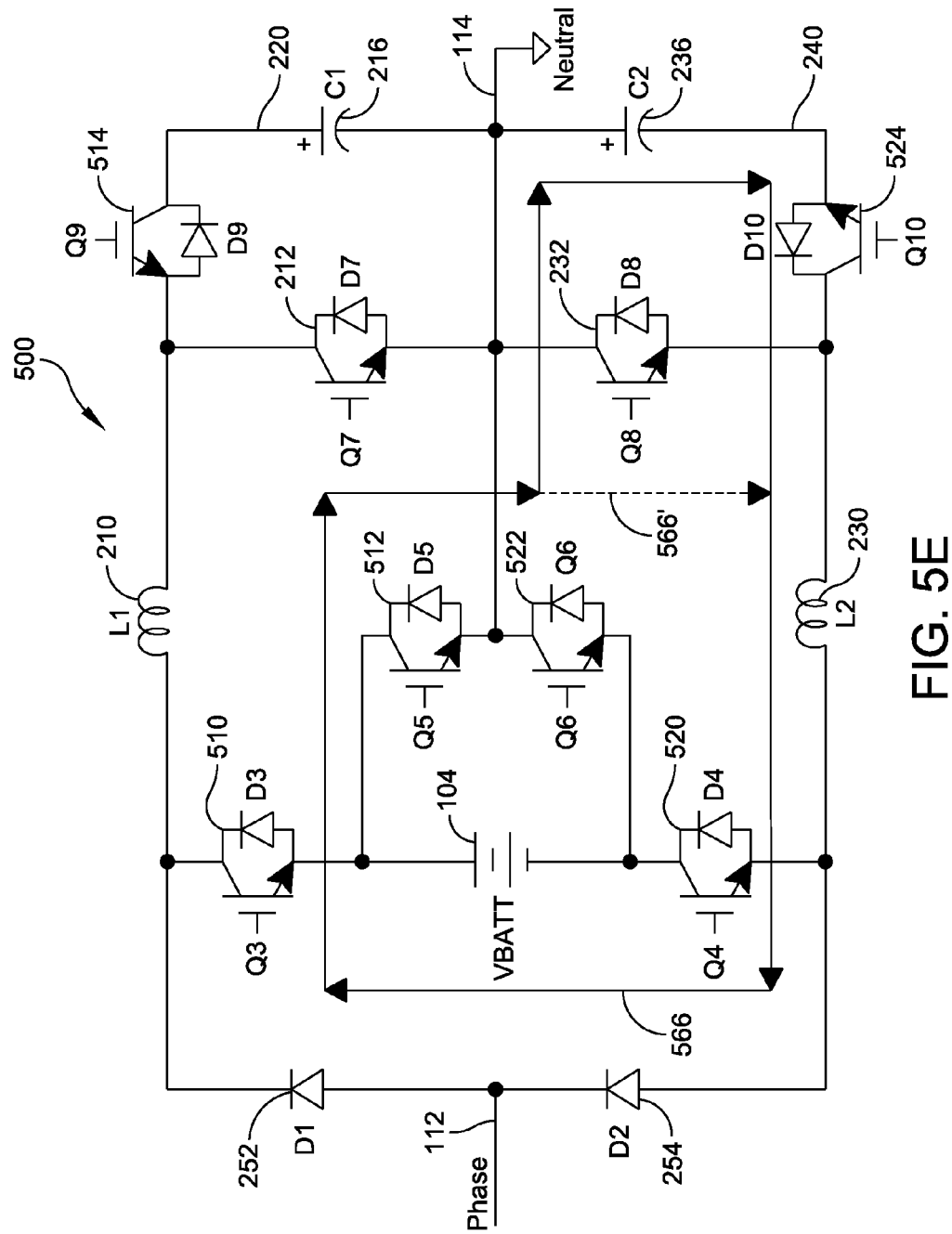

Similarly, power from the battery 104 can be transferred to the negative DC bus 240, including capacitor 236, during a negative DC output voltage conversion phase by operating switches 232 and 524 and inductor 230 as a boost converter via the switch 520, as illustrated in FIG. 5E. The switch 512 is turned on. A current 566 transferred to the capacitor 236 can be controlled by modulating the turn on time of the switch 232. That is, when the switch 232 is off (e.g., open), the current 566 follows the path of the solid line in FIG. 5E and passes through the capacitor 236; otherwise, when the switch 232 is on (e.g., closed), the current 566 follows the path of the broken line 566' and passes through the switch 232. The switches 510, 522, 212 and 514 are turned off while transferring power to the negative DC bus 240.

Figure 6:
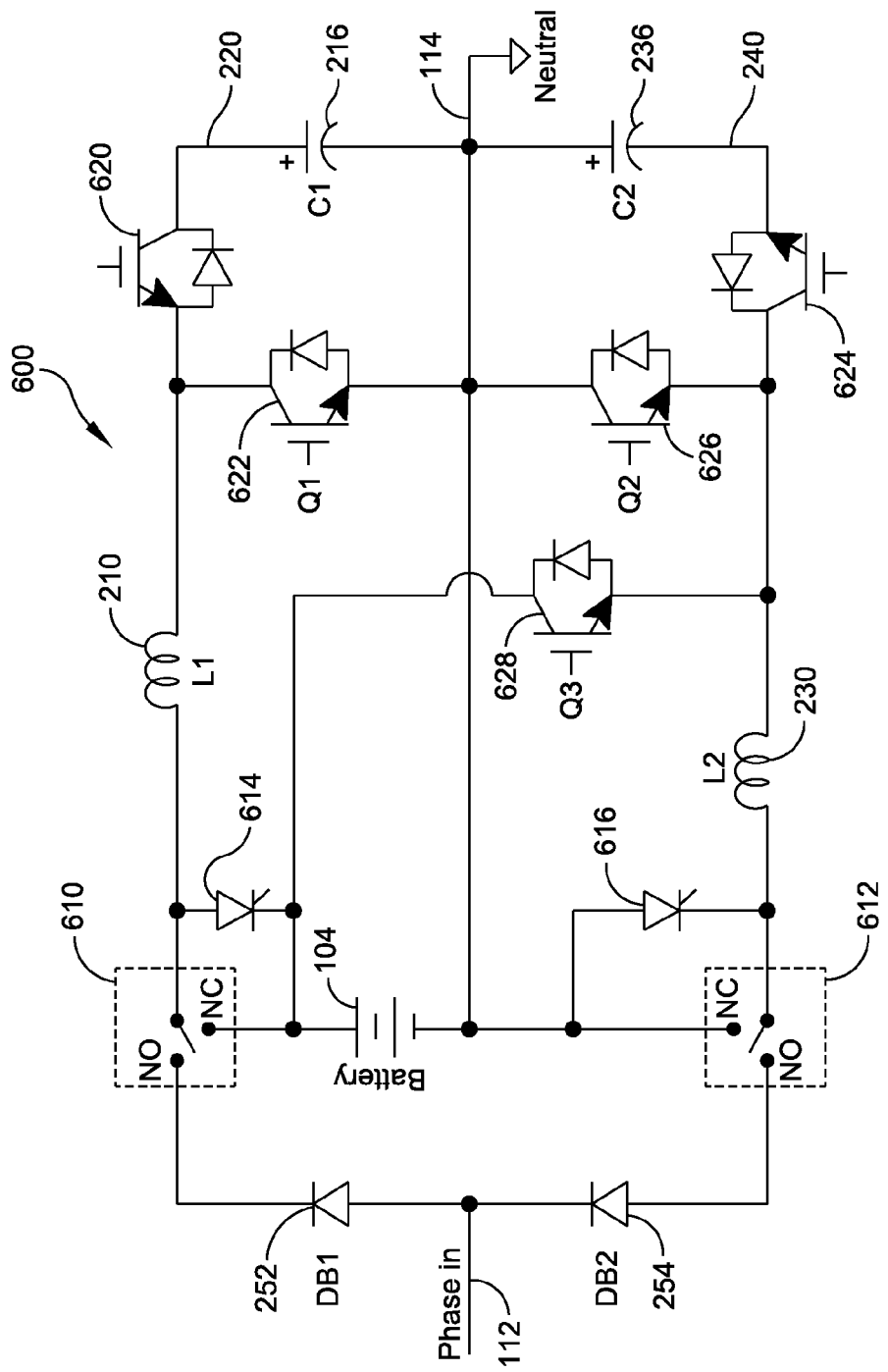
FIG. 6 is a schematic diagram of a power conversion circuit in accordance with another embodiment of the present invention.

FIG. 6 is a schematic diagram of a rectifier/boost/charger circuit 600 according to another embodiment of the invention. The rectifier/boost/charger circuit 600 may be used, for example, in a UPS such as shown in FIG. 1. The rectifier/boost/charger circuit 600 is configured for a single battery system, where one end of the battery 104 is tied to a neutral point of the AC input 114. The circuit 600 includes relays 610 and 612, a plurality of switches 620, 622, 624, 626, 628 and SCRs 614 and 616.

In the embodiment shown in FIG. 6, relays 610 and 612 are each used to switch between line mode of operation and backup mode of operation. For example, the relays 610 and 612 may each be moved to the respective normally open (NO) positions shown in FIG. 6 during line mode of operation to switch the AC input 112 (i.e., phase) into the circuit 600. The same relays 610 and 612 may each be moved to the respective normally closed (NC) positions during backup mode of operation to switch the battery 104 into the circuit 600. Switches 620, 622, 624, 626 and 628, among others, may be implemented, for example, as MOSFET switches, and may function in a manner substantially similar to diode 214, switch 212, diode 234, switch 232 and switch 242, respectively, in the circuit 200 of FIG. 2.

In line mode of operation and during a positive portion of the AC input 112 (e.g., during a positive portion of the AC input waveform), the relays 610 and 612 are moved to the NO position as shown in FIG. 6. A portion of the circuit 600 including switch 622, switch 620 and inductor 210 is configured to operate as a boost converter to transfer power from the AC input line 112 via rectifier diode 252 to capacitor 216 at the positive DC bus 220. During this mode of operation, the charger power to the battery 104 can be generated from the negative bus 240 by operating the switches 624, 626, 628, SCR 616, and the inductor 230 as a buck-boost converter. The charger power can be controlled by controlling the on time of the switch 624. The SCR 616 is kept on and the SCR 614 is kept off during this mode of operation.

In line mode of operation and during a negative portion of the AC input 112 (e.g., during a negative portion of the AC input waveform), another portion of the circuit 600 including switch 626, switch 624, and inductor 230 is configured to operate as a boost converter to transfer power from the AC input line 112 via rectifier diode 254 to capacitor 236 at the negative DC bus 240. During this mode of operation, the charger power to the battery 104 can be generated from the positive bus 220 by operating the switches 620, 622, SCR 614 and the inductor 210 as a buck converter. The charger power can be controlled by controlling the on time of the switch 620. The SCR 614 is kept on and the SCR 616 is kept off during this mode of operation.

In backup mode of operation, when the input AC power 112 is not available, power from the battery 104 can be transferred to the positive DC bus 220, including capacitor 216, during a positive DC output voltage conversion phase by operating switches 622 and 620, and inductor 210, as a boost converter. The relays are moved to the NC position as shown in FIG. 6. A current transferred to the capacitor 216 can be controlled by modulating the turn on time of the switch 622.

Similarly, power from the battery 104 can be transferred to the negative DC bus 240, including capacitor 236, during a negative DC output voltage conversion phase by operating switches 626 and 624, and inductor 230 as a buck-boost converter. A current transferred to the capacitor 236 can be controlled by modulating the turn on time of the switch 626. In one embodiment, during the backup mode of operation, both of the above-described converters (i.e., boost and buck-boost) shown in FIG. 6 can be operated simultaneously to transfer power from the battery 104 to the positive DC bus 220 and the negative DC bus 240, respectively.

Figure 7:
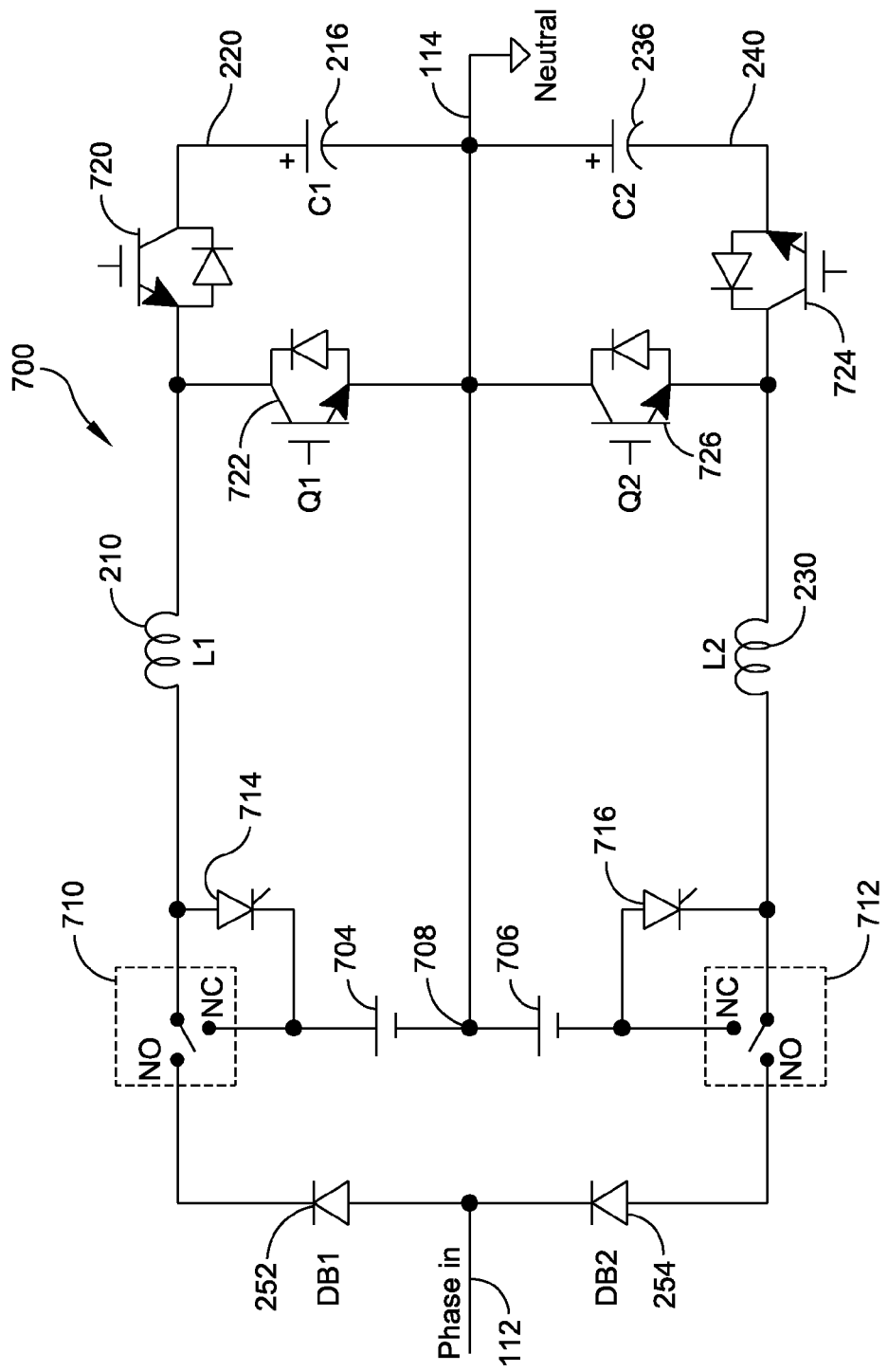
FIG. 7 is a schematic diagram of a power conversion circuit in accordance with yet another embodiment of the present invention.

FIG. 7 is a schematic diagram of a rectifier/boost/charger circuit 700 according to another embodiment of the invention. The rectifier/boost/charger circuit 700 may be used, for example, in a UPS such as shown in FIG. 1. The rectifier/boost/charger circuit 700 is configured for a split (e.g., dual) battery system, where two batteries are used. A first battery 704 is maintained at a positive voltage, and a second battery 706 is maintained at a negative voltage. A mid-point 708, which is the junction point of the negative terminal of the first battery 704 and the positive terminal of the second battery 706, is tied to a neutral point 114 of the AC input. The circuit 700 includes relays 710 and 712, a plurality of switches 720, 722, 724, and 726, and SCRs 714 and 716. Portions of the circuit 700 (e.g., a portion including inductor 210, switches 720 and 722, and capacitor 216, or another portion including inductor 230, switches 724 and 726, and capacitor 236) may be operated as a buck converter during a negative portion of the AC input 112 to charge the first battery 704, and during a positive portion of the AC input 112 to charge the second battery 706, respectively.

It is appreciated that, according to at least one embodiment of the invention, one advantage over conventional circuits is that a battery charger may be integrated within a front-end PFC converter, thus reducing the total number of components in the circuit.

Any of the preceding embodiments can be implemented within a UPS, for example, a UPS having a DC battery as a backup power source. The UPS may be configured to provide backup power for any number of power consuming devices, such as computers, servers, network routers, air conditioning units, lighting, security systems, or other devices and systems requiring uninterrupted power. The UPS may contain, or be coupled to, a controller or control unit to control the operation of the UPS. For example, the controller may provide pulse width modulated (PWM) signals to each of the switching devices within the circuit for controlling the power conversion functions. In another example, the controller may provide control signals for the relays. In general, the controller controls the operation of the UPS such that it charges the battery from the AC power source when power is available from the AC power source, and inverts DC power from the battery when the AC power source is unavailable or during brown-out conditions. The controller can include hardware, software, firmware, a processor, a memory, an input/output interface, a data bus, and/or other elements in any combination that may be used to perform the respective functions of the controller.

In the embodiments described above, a battery is used as a backup power source. In other embodiments, other AC or DC backup sources and devices may be used including fuel cells, photovoltaics, DC micro turbines, capacitors, an alternative AC power source, any other suitable power sources, or any combination thereof. In embodiments of the invention that utilize a battery as a backup power source, the battery may be comprised of multiple batteries of cells coupled in parallel or in series.

In one or more of the preceding embodiments, the switching devices may be any electronic or electromechanical device that conducts current in a controlled manner (e.g., by using a control signal) and can isolate a conductive path. Representations of various switching devices, and other electronic devices, in the figures are exemplary and not intended to be limiting, as it will be appreciated by one skilled in the art that similar or identical functionality may be obtained using various types, arrangements, and configurations of devices. For example, one or more of the switching devices may contain one or more anti-parallel diodes, or such diodes may be separate from the switching devices. The switches may each be implemented, for example, as transistors using FETs, IGBTs, MOSFETs, bipolar junction transistors, transistors with anti-parallel diodes, or other switching devices known to one of skill in the art. As indicated above, in some embodiments, the switching devices include a rectifier, for example, a controlled rectifier that can be turned on and off with the application of a control signal (e.g., an SCR, a thyristor, etc.). Additionally, other devices, such as resistors, capacitors, inductors, batteries, power supplies, loads, transformers, relays, diodes, and the like may be included in a single device, or in a plurality of connected devices.

In the embodiments described above, rectifier/boost circuits are described for use with uninterruptible power supplies, although it should be appreciated that the circuits described herein may be used with other types of power supplies.

Embodiments of the present invention may be used with uninterruptible power sources having a variety of input and output voltages and may be used in single phase or multiphase uninterruptible power supplies.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, the gating pulses used to operate the switching devices of the power converter may vary in frequency, duty cycle, or both. Further, alternative configurations of electrical components may be utilized to produce similar functionality, for example, inverter and charger functions, or other functions. Accordingly, the foregoing description and drawings are by way of example only.

What is claimed is:

1. A power converter, comprising:
   an AC power input having a phase input connection and a neutral input connection, the AC power input being configured to receive an AC input voltage;
   a backup power input configured to receive a backup voltage from a backup power source;
   a first capacitive element configured to store a positive DC output voltage with respect to the neutral input connection;
   a second capacitive element configured to store a negative DC output voltage with respect to the neutral input connection; and
   a power converter circuit having a first inductive element and a second inductive element, the power converter circuit being coupled to the AC power input, the backup power input, the first capacitive element and the second capacitive element, the power converter circuit being configured to:
      in a line mode of operation and during a positive portion of the AC input voltage, convert the AC input voltage into the positive DC output voltage through the first inductive element and provide a charging voltage to the backup power source through the second inductive element using the negative DC output voltage stored in the second capacitive element; and
      in the line mode of operation and during a negative portion of the AC input, convert the AC input voltage into the negative DC output voltage through the second inductive element and provide the charging voltage to the backup power source through the first inductive element using the positive DC output voltage stored in the first capacitive element.

2. The power converter of claim 1, wherein the power converter circuit is further configured to:
   in a backup mode of operation and during a positive DC output voltage conversion phase, convert the backup voltage into the positive DC output voltage through the first inductive element; and
   in the backup mode of operation and during a negative DC output voltage conversion phase, convert the backup voltage into the negative DC output voltage through the second inductive element.

3. The power converter of claim 1, further comprising an inverter circuit coupled to the first capacitive element and the second capacitive element, the inverter circuit being configured to generate an AC output voltage from the positive DC output voltage and the negative DC output voltage.

4. The power converter of claim 1, wherein the backup power source includes a battery, wherein the battery has a first end connection, a second end connection, and no midpoint connection, and wherein the power converter circuit includes a first active switch coupled to the phase input connection and the first end connection of the battery, a second active switch coupled to the phase input connection and the second end connection of the battery, a third active switch coupled to the neutral input connection and the first end connection of the battery, and a fourth active switch coupled to the neutral input connection and the second end connection of the battery.

5. The power converter of claim 4, further comprising a rectifier circuit having a positive output and a negative output, the rectifier circuit being coupled to the phase input connection, wherein the first active switch is coupled to the positive output of the rectifier circuit and the second active switch is coupled to the negative output of the rectifier circuit.

6. The power converter of claim 1, wherein the backup power source includes a battery, wherein the battery has a first end connection, a second end connection coupled to the neutral input connection, and no midpoint connection, and wherein the power converter circuit includes a first relay configured to switchably couple the first inductive element to the phase input connection and the first end connection of the battery, a second relay configured to switchably couple the second inductive element to the phase input connection and the second end connection of the battery, and an active switch coupled to the first end connection of the battery and the second inductive element.

7. The power converter of claim 6, further comprising a rectifier circuit having a positive output and a negative output, the rectifier circuit being coupled to the phase input connection, wherein the first relay is coupled to the positive output of the rectifier circuit and the second relay is coupled to the negative output of the rectifier circuit.

8. The power converter of claim 1, wherein the backup power source includes a battery, wherein the battery has a first end connection, a second end connection, and a midpoint connection coupled to the neutral input connection, and wherein the power converter circuit includes a first relay configured to switchably couple the first inductive element to the phase input connection and the first end connection of the battery, and a second relay configured to switchably couple the second inductive element to the phase input connection and the second end connection of the battery.

9. The power converter of claim 8, further comprising a rectifier circuit having a positive output and a negative output, the rectifier circuit being coupled to the phase input connection, wherein the first relay is coupled to the positive output of the rectifier circuit and the second relay is coupled to the negative output of the rectifier circuit.

10. A power converter, comprising:
    an AC power input having a phase input connection and a neutral input connection, the AC power input being configured to receive an AC input voltage;
    a backup voltage source to provide a backup voltage;

a first storage element configured to store a positive DC output voltage with respect to the neutral input connection;

a second storage element configured to store a negative DC output voltage with respect to the neutral input connection; and means for, in a line mode of operation and during a positive portion of the AC input voltage, converting the AC input voltage into the positive DC output voltage and providing the negative DC output voltage stored in the second storage element to the backup voltage source, and, in the line mode of operation and during a negative portion of the AC input voltage, converting the AC input voltage into the negative DC output voltage and providing the positive DC output voltage stored in the first storage element to the backup voltage source.

11. The power converter of claim 10, further comprising means for, in a backup mode of operation and during a positive DC output voltage conversion phase, converting the backup voltage into the positive DC output voltage, and, in the backup mode of operation and during a negative DC output voltage conversion phase, converting the backup voltage into the negative DC output voltage.

12. The power converter of claim 10, wherein the backup voltage source includes at least one battery.

13. The power converter of claim 12, wherein the at least one battery has a first end connection coupled to the phase input connection and a second end connection.

14. The power converter of claim 13, wherein the second end connection of the at least one battery is coupled to the neutral input connection.

15. The power converter of claim 12, wherein the at least one battery has a first end connection, a second end connection, and a midpoint connection, the midpoint connection being coupled to the neutral input connection.

16. A method of providing power to a load, comprising:
receiving AC input power at a phase input connection and a neutral input connection from a primary power source;
during a positive portion of the AC input power, converting the AC input power into a positive DC output voltage with respect to the neutral input connection using a first inductive element;
during a negative portion of the AC input power, converting the AC input power into a negative DC output voltage with respect to the neutral input connection using a second inductive element;
during the positive portion of the AC input power, providing the negative DC output voltage to a backup power source using the second inductive element; and
during the negative portion of the AC input power, providing the positive DC output voltage to the backup power source using the first inductive element.

17. The method of claim 16, wherein the AC input power is converted into the positive DC output voltage and into the negative DC output voltage using at least one first circuit configured as a boost converter, and wherein the positive DC output voltage and the negative DC output voltage are each provided to the backup power source using at least one second circuit configured as a buck converter.

18. The method of claim 16, further comprising detecting a loss of the AC input power, converting a backup power from a backup power source into the positive DC output voltage using the first inductive element during a positive DC output voltage conversion phase, and converting the backup power from the backup power source into the negative DC output voltage using the second inductive element during a negative DC output voltage conversion phase.

19. The method of claim 16, further comprising producing an AC output voltage from the positive DC output voltage and the negative DC output voltage.

20. The method of claim 16, wherein the backup power source includes at least one battery.

* * * * *